UNITED STATES PATENT OFFICE.

EDWARD D. KENDALL, OF SEWAREN, NEW JERSEY, ASSIGNOR OF ONE-HALF TO E. N. DICKERSON, OF STOVALL, NORTH CAROLINA, AND ONE-TENTH TO ALBERT R. LEDOUX, OF NEW YORK, N. Y.

PROCESS FOR SMELTING ORES OF IRON.

No. 894,796.      Specification of Letters Patent.      Patented July 28, 1908.

Application filed November 3, 1906. Serial No. 341,942.

*To all whom it may concern:*

Be it known that I, EDWARD D. KENDALL, a citizen of the United States, residing at Sewaren, in the county of Middlesex and State of New Jersey, have invented new and useful Improvements in Processes for Smelting Ores of Iron, of which the following is a specification.

My invention relates particularly to the reduction of iron oxids to metallic iron with subsequent agglomeration and fusion of the iron, and its object is to effect this reduction in a practical way by means of petroleum or products from petroleum, and under conditions that facilitate the said agglomeration and fusion.

In carrying out my invention the ore or ores should first be crushed and granulated or pulverized to a degree of fineness dependent on the character of the ore, for example, a hard red hematite should, preferably, be pulverized to pass through a sieve having forty meshes to the linear inch. This comminuted ore is to be thoroughly mixed with granulated or pulverized lime or limestone, broken or crushed lime or limestone may be added to the broken or crushed iron-ore and both granulated or pulverized together, or the ore and lime or limestone may be mechanically reduced separately and mixed afterward. With this mixture is to be incorporated heavy petroleum, practically non-volatile at the ordinary temperatures, or petroleum residues, liquid, semi-solid or solid, which remain after distilling off the latter hydrocarbons from the natural petroleum.

The quantity of lime or limestone is to be proportioned according to the nature of the ore and if this be deficient in silica or if the addition to the ore of silica and argillaceous ore or other body is needed to form a slag with the lime or limestone in the smelting furnace; then the necessary addition should be made to the ore, preferably at the time the lime or limestone is added. The quantity of heavy hydrocarbon to be added to the mixture of ore and lime or limestone is to be determined by the nature of the ores and also when a fluid hydrocarbon is used, by absorbent capacity of the solid mixture, the objection to a considerable excess of hydrocarbon being chiefly the cost of the same.

I have found, in the course of a long continued series of experiments and tests, that granulated or pulverized hematites alone cannot carry in the interstices enough petroleum or petroleum-produced (liquid or melted solid) to effect complete reduction of the ore and therefore must be associated with the lime or limestone, that is to say with the slag-forming body or bodies in order that the mass shall have a sufficient capacity of absorption. The purpose of the hydrocarbon is, of course, to remove the oxygen from the iron in the ore under the influence of heat; the effective degree of heat is not excessive, the complete reduction of the ore to metallic iron taking place below a red heat; therefore this reduction may be accomplished in suitable well known forms of iron retorts the melting of the slag-forming bodies and fusion of the reduced iron to be effected afterward in a suitable furnace.

What I claim is—

1. A process of reducing iron from its ores which consists in thoroughly admixing with comminuted ore a comminuted slag forming body and then mixing with the mass petroleum comparatively non-volatile at ordinary temperature and in a sufficient amount to constitute the sole reducing agent.

2. A process of reducing iron from its ores which consists in thoroughly admixing with comminuted ore comminuted lime-stone and then mixing with the mass petroleum comparatively non-volatile at ordinary temperature and in a sufficient amount to constitute the sole reducing agent.

3. A process of reducing iron from its ores which consists in thoroughly admixing with comminuted ore a comminuted slag forming body and then admixing with the mass petroleum in a sufficient amount to constitute the sole reducing agent.

4. A process of reducing iron from its ores which consists in thoroughly admixing with comminuted ore comminuted lime-stone and then mixing with the mass petroleum in a sufficient amount to constitute the sole reducing agent.

In testimony whereof I have signed this specification in the presence of two subscribing witnesses.

EDWARD D. KENDALL.

Witnesses:
     OLIN A. FOSTER,
     GEO. W. JAEKEL.